United States Patent

Donnelli

[11] 3,902,537
[45] Sept. 2, 1975

[54] MACHINE FOR DRIVING THREADED FASTENERS

[75] Inventor: Joseph W. Donnelli, Rockford, Ill.

[73] Assignee: Southern Imperial, Inc., Tupelo, Miss.

[22] Filed: Aug. 6, 1974

[21] Appl. No.: 495,224

[52] U.S. Cl. .............. 144/32; 29/38.3; 51/237 T; 81/53.2; 90/56 R; 279/1 H; 279/5
[51] Int. Cl. .......................................... B25b 23/10
[58] Field of Search ....... 279/1 H, 5; 29/38 R, 38.3; 90/56 R; 144/32; 83/552; 51/237 T; 269/69, 63, 70

[56] References Cited
UNITED STATES PATENTS

| | | | |
|---|---|---|---|
| 2,492,307 | 12/1949 | McKean | 81/53.2 |
| 2,507,998 | 5/1950 | Russell | 51/237 T X |
| 2,516,288 | 7/1950 | Bagoon | 81/53.2 |
| 3,583,451 | 6/1971 | Dixon | 144/32 |

FOREIGN PATENTS OR APPLICATIONS

8,940 12/1955 Germany .............. 144/32

Primary Examiner—J. M. Meister
Assistant Examiner—W. D. Bray
Attorney, Agent, or Firm—Wolfe, Hubbard, Leydig, Voit & Osann, Ltd.

[57] ABSTRACT

Hanger bolts are delivered one-by-one from a hopper and each is picked up by a reciprocating pusher which loads the bolt into one of four power-rotated chucks spaced angularly about an indexable head. Thereafter, the head is indexed to move the bolt to a driving station where the bolt may be driven rapidly into a workpiece simply by placing the workpiece in engagement with the bolt.

10 Claims, 11 Drawing Figures

PATENTED SEP 2 1975

MACHINE FOR DRIVING THREADED FASTENERS

BACKGROUND OF THE INVENTION

This invention relates to a machine for screwing threaded fasteners into workpieces. The invention more particularly relates to a machine for driving a fastener into a workpiece of the type which does not readily lend itself to automatic handling and which usually is held in the hand of an operator during the driving operation.

SUMMARY OF THE INVENTION

The general aim of the present invention is to provide a new and improved fastener driving machine of the above character which effects quick and easy driving of the fasteners and which is completely automated to the extent that the operator need perform no other task than to place the workpieces into engagement with the threaded fasteners.

A more detailed object is to provide a machine which automatically feeds the fasteners to an intermittently rotatable head having a series of power-driven chucks for gripping and rotating the fasteners, each chuck first being indexed to a loading station to receive the fastener and then being indexed to a driving station where the fastener may be threaded into the workpiece merely by placing the workpiece against the fastener.

A further object of the invention is to rotate the head in a unique and extremely simple manner by taking advantage of the force used to drive the chucks.

Another important object of the invention is to provide an indexable multi-chuck head having a back and forth motion which may be used to advantage to completely automate the machine and eliminate the need for the operator to place the workpieces in engagement with the fasteners.

The invention also resides in the novel means for feeding the fasteners to the loading station and for stopping each chuck momentarily in the loading station so that a fastener may be loaded into the chuck prior to indexing of the chuck to the driving station.

These and other objects and advantages of the invention will become more apparent from the following detailed description when taken in conjunction with the accompanying drawings.

DETAILED DESCRIPTION OF THE PREFERRED EMBODIMENT

Figure 2:
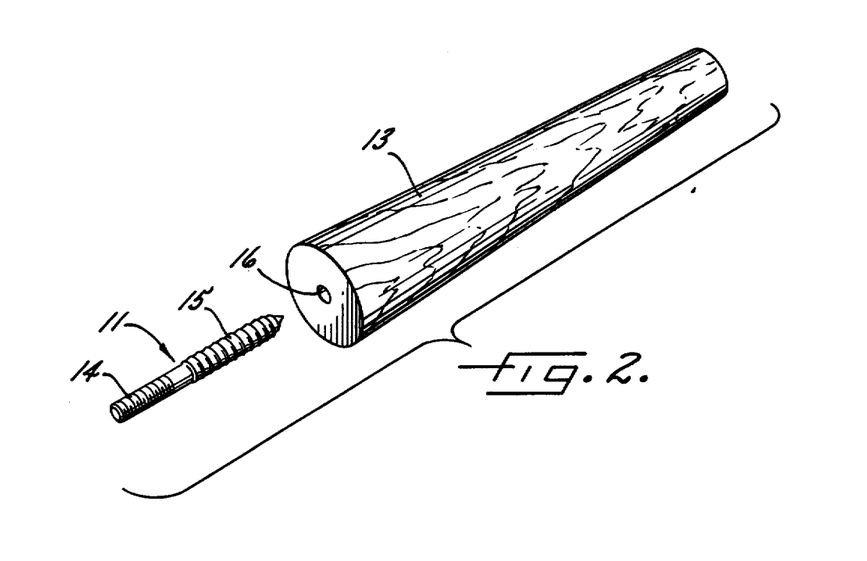
FIG. 2 is an exploded perspective view showing an exemplary fastener and workpiece.

As shown in the drawings for purposes of illustration, the invention is embodied in a machine 10 for screwing threaded fasteners 11 into workpieces 13. Herein, each fastener comprises a so-called hanger bolt having a nut end 14 (FIG. 2) with a machine thread and a screw end 15 with a wood-type thread. The screw end 15 of the bolt 11 is adapted to be threaded into a predrilled hole 16 in the workpiece 13 which, in this instance, is in the form of a wood leg for a piece of furniture.

The present invention contemplates the provision of a comparatively simple and high speed machine 10 which stores a supply of the fasteners 11, automatically feeds the fasteners one-by-one from the supply, and then effects automatic threading of the fasteners into the workpieces 13 with the operator of the machine needing to do nothing more than to hold the workpiece against the fastener while the latter is being driven into the workpiece. As a result, the fasteners can be driven into the workpieces at high production rates and with very little effort of the part of the operator. In addition, the machine can be easily adapted for a completely automated operation in which the workpieces are automatically delivered to the machine for driving of the fasteners.

Figures 3, 4:
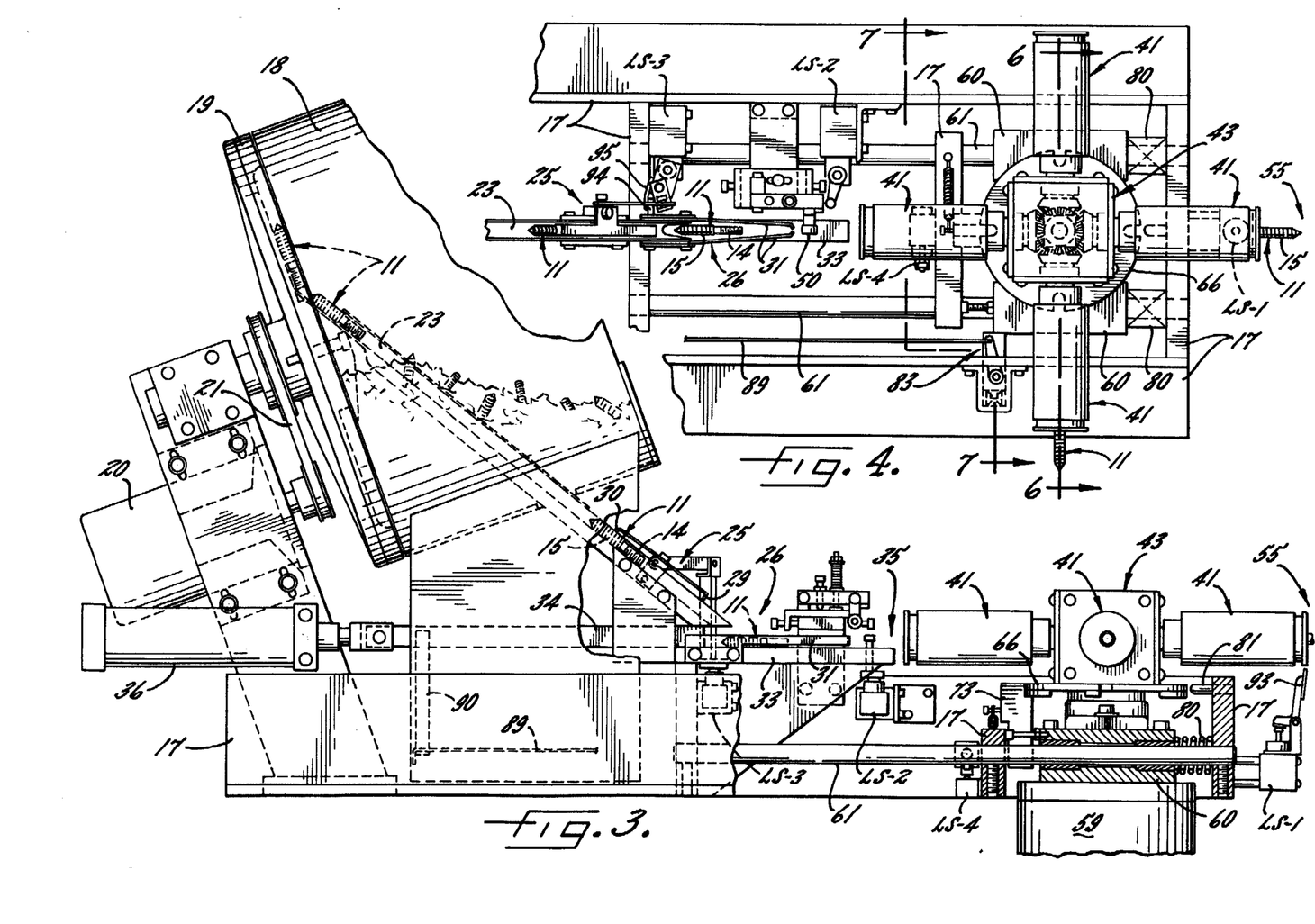
FIG. 3 is an enlarged fragmentary elevational view of the machine shown in FIG. 1, parts of the machine being broken away and shown in section.
FIG. 4 is a fragmentary plan view of the machine shown in FIG. 3.

More specifically, the machine 10 comprises a main support or frame 17 upon which is mounted a stationary supply hopper 18 having a grooved end plate 19 adapted to be rotated about an upwardly and forwardly inclined axis by an electric motor 20 (FIG. 3) and a drive belt 21. Bolts 11 gravitate downwardly and rearwardly in the hopper toward the end plate and are carried around to the upper portion thereof. Thereafter, the bolts slide one-by-one down a downwardly and forwardly inclined channel-like track 23 leading from the hopper, the bolts being properly oriented on the end plate so as to proceed down the track with their nut ends 14 disposed in leading relationship.

Figures 5A, 5B:
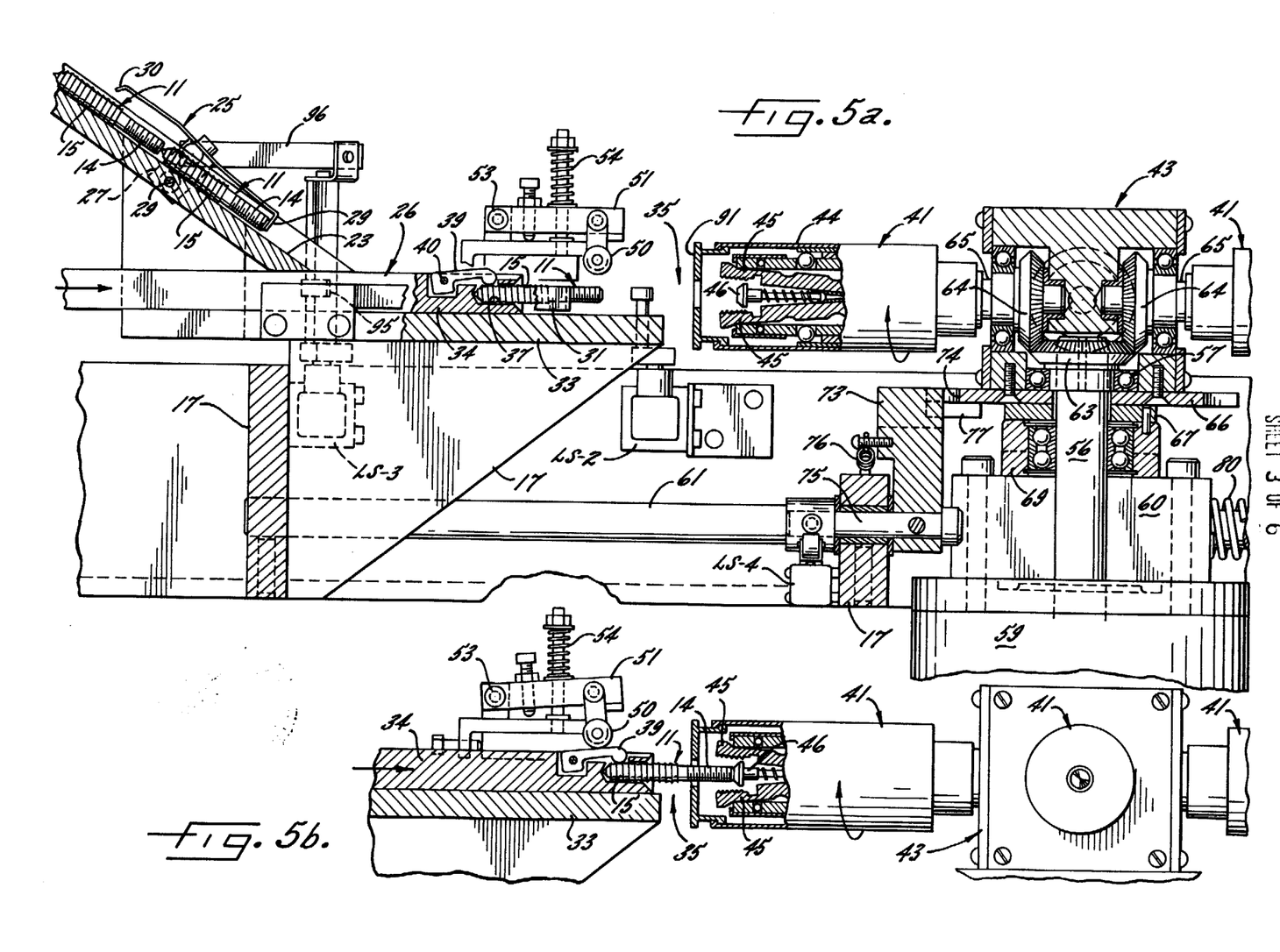
FIGS. 5a to 5d are enlarged fragmentary views similar to FIG. 3 but showing parts of the machine in successively moved positions.

An extremely simple escapement 25 (FIGS. 3 and 5a) is positioned near the lower end portion of the track 23 to release the bolts 11 one-by-one into a pick up station 26 located at the lower end of the track. Herein, the escapement comprises an elongated metal strip whose midportion is attached to a block 27 (FIG. 5a) adapted to swing about a horizontal pivot 29 on the track 23. When the escapement is positioned clockwise about the pivot as shown in FIG. 5a, a tab 30 on the lower end of the escapement engages the nut end 14 of the leading bolt and prevents the latter from sliding down the track 23. As the escapement is rocked counterclockwise, the tab releases the bolt to slide into the pick up station 26 and, at the same time, a finger 30 on the rear end of the escapement bears downwardly against the screw end 15 of the next bolt to hold that bolt in place on the track while the tab 29 is in its upper release position (see FIG. 3). Upon subsequent clockwise rocking of the escapement, the finger 30 releases the next bolt so that it may slide downwardly to be caught by the tab until ready for release into the pick up station.

Each bolt 11 moving into the pick up station 26 drops into a horizontal position between a pair of horizontally spaced and forwardly tapered spring fingers 31 (FIGS. 4 and 8) attached to a forwardly extending rail 33 on the frame 17. The bolt then is picked up by a feeder or pusher 34 and is moved forwardly to a loading station 35 (FIG. 5a) located adjacent the forward end of the rail. The pusher comprises a horizontal bar which is adapted to be reciprocated back and forth by an air-operated actuator 36 (FIG. 3) mounted on the rear portion of the frame 17. When the pusher 34 is fully retracted (FIG. 3), its forward end is located just rearwardly of the bolt 11 in the pick up station 26. As the pusher is advanced (FIG. 5a), the screw end 15 of the bolt is picked up by and telescopes into a socket 37 formed in the leading end of the pusher, the mouth of the socket being flared to facilitate picking up of the bolt from the rail 33. A dog 39 is pivoted at 40 on the pusher and extends into the upper end of the socket in engagement with the screw end 15 of the bolt 11 to help stabilize the latter within the socket.

Upon being advanced forwardly from the pick up station 26 to the loading station 35, the bolt 11 moves between and is gripped resiliently by the free ends of the spring fingers 31 (FIGS. 4 and 8), which serve to keep the bolt in longitudinal alinement with the pusher 34 during the advance of the bolt. As the bolt reaches the loading station, its nut end 14 is telescoped into and griped by one of four power-rotated and horizontally extending chucks 41 which are carried on and spaced equally around an indexable head 43.

Figure 5C:
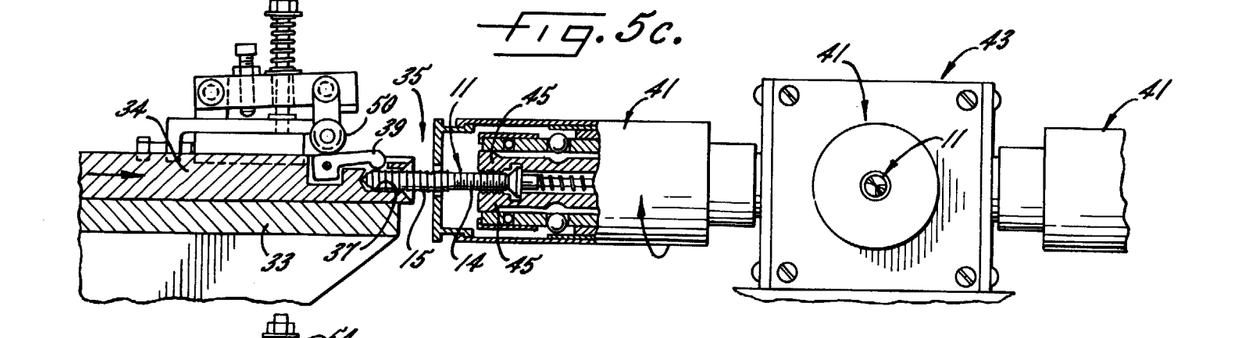

The chucks 41 may be of conventional construction such as disclosed, for example, in U.S. Pat. Nos. 2,492,307 and 2,531,456 and need not here be described in detail. It will suffice to say that each chuck includes a continuously rotating sleeve 44 (FIG. 5a) having a pair of jaws 45 which are initially stationary and open to receive the bolt 11. As the bolt moves forwardly between the jaws and engages a plunger 46 (see FIG. 5b), the latter is pushed forwardly to cause the jaws to close and grip the bolt (FIG. 5c). With continued forward movement of the bolt into the sleeve 44, the jaws are coupled to and rotate in unison with the sleeve so as to rotate the bolt about its own axis. In order to stablize the bolt and prevent the bolt from turning before it is securely locked by the jaws, the dog 39 on the pusher 34 is pressed downwardly against the screw end 15 of the bolt by a roller 50 (FIG. 5b) located adjacent the outer end of the rail 33 and above the dog so that the dog rides beneath the roller as the bolt is first loaded into the chuck 41. The roller is carried on a lever 51 pivoted at 53 on the frame 17 and is urged downwardly by a spring 54 so as to firmly press the dog downwardly against the bolt when the dog is beneath the roller. As the bolt advances sufficiently far to be held securely in the jaws 45, the dog 39 moves forwardly from beneath the roller 50 (see FIG. 5d) to release the spring force on the bolt and permit the bolt to rotate freely in unison with the chuck 41.

Figure 5D:
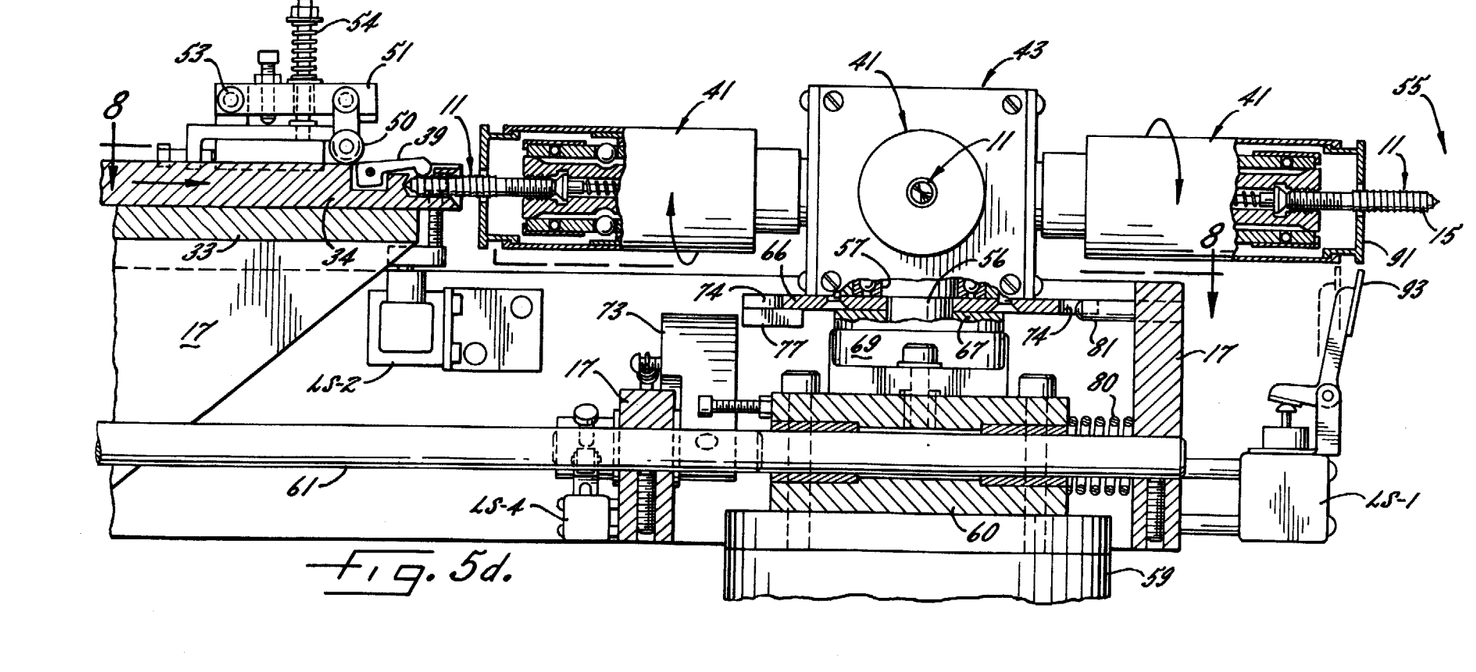
Figure 6:
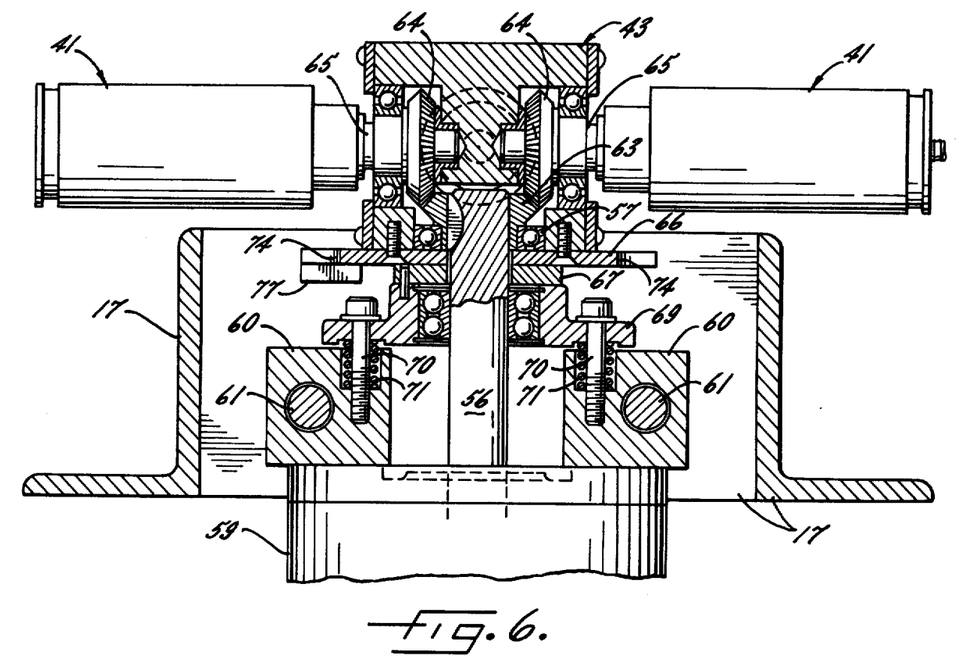
FIGS. 6 and 7 are enlarged fragmentary cross-sections taken substantially along the lines 6—6 and 7—7, respectively, of FIG. 4.

In keeping with the invention, the head 43 which supports the chucks 41 is indexed in a novel and extremely simple manner so as to ultimately rotate each loaded chuck in the loading station 35 to a diametrically spaced driving station 55 (FIGS. 1 and 5d) where the bolt may be driven into the workpiece. As shown in FIG. 6, the head comprises a box-like housing which is journaled for rotation with respect to an upright drive shaft 56 by a ball bearing 57. The drive shaft constitutes the output shaft of an electric motor 59 which is supported on the lower side of two blocks 60 mounted for back and forth sliding on a pair of guide rods 61 on the frame 17. A bevel gear 63 is keyed to the upper end of the drive shaft 56 and meshes with four right angle gears 64 fastened to the drive shafts 65 of the chucks 41 so as to rotate the chucks when the motor 59 is energized. The force created by engagement of the rotating gear 63 with the gears 64 and the centrifugal force resulting from the rotating chucks 41 cause the entire head 43 to spin rapidly in a counterclockwise direction (FIG. 1) about the bearing 57 and the upright drive shaft 56.

During rotation of the head 43, a plate 66 (FIG. 6) on the underside of the head rubs against a friction pad 67 supported rigidly on a bearing housing 69 which is fastened to the upper sides of the support blocks 60 by screws 70. Springs 71 are telescoped over the screws and are located beneath the bearing housing 69 to urge the pad 67 upwardly against the plate 66. By adjusting the screws, the frictional resistance of the plate against the pad may be changed in order to vary the speed at which the head spins or rotates.

Figure 7:
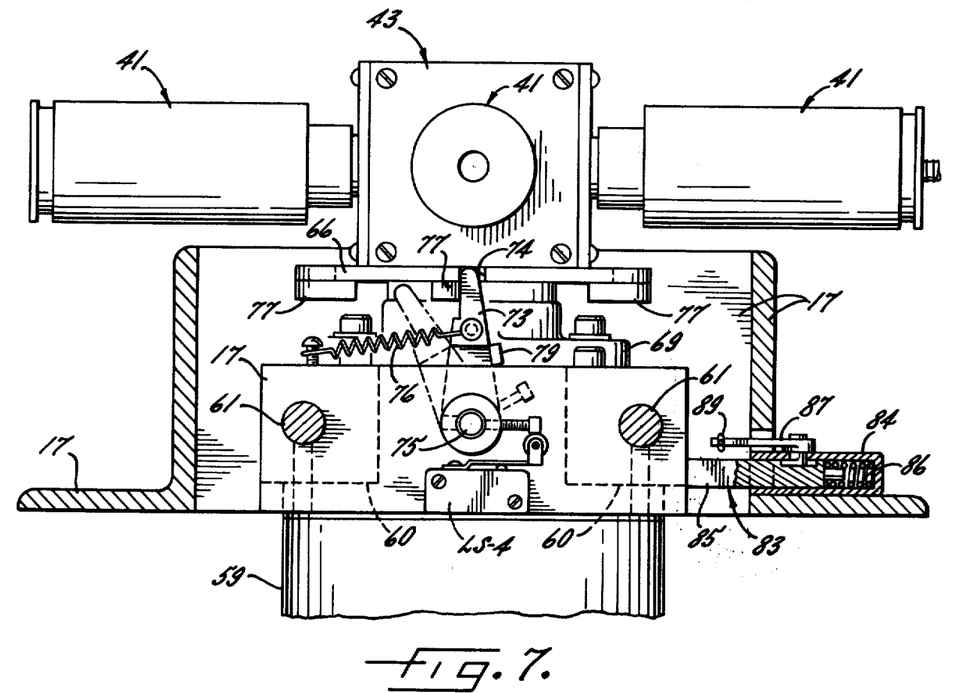

Each time a chuck 41 rotates into the loading station 35, the head 43 is stopped momentarily to enable the bolt 11 to be loaded into the chuck by a pusher 34. For this purpose, a stop or pawl 73 (FIGS. 5a, 5d, 7 and 8) is located adjacent the loading station and is adapted to engage coacting stops on the head. In this instance, each stop on the head comprises the trailing side of a recess or notch 74 (FIG. 8) which is formed in the periphery of the plate 66, there being four recesses spaced angularly around the plate and disposed in vertical alinement with the four chucks 41. The pawl 73 is pivoted at 75 (FIG. 7) on the frame 17 and is urged in a counterclockwise direction by a contractile spring 76 connected between the pawl and the frame. During rotation of the head 43, the pawl is disposed in an inactive position shown in phantom in FIG. 7 and is located beneath the plate 66, counterclockwise pivoting of the pawl past the position shown in phantom being limited by engagement of part of the pawl with part of the frame. Each time a chuck 41 approaches the loading station 35, the pawl is engaged by a lug 77 depending from the plate 66 and located adjacent the trailing edge of the notch 74 associated with the chuck. The lug pivots the pawl clockwise toward an active position shown in full in FIG. 7 and, as the chuck reaches the loading station, the upper end of the pawl swings into the notch 74 and bears against the trailing edge thereof to stop rotation of the head 43. Clockwise pivoting of the pawl past the active position is prevented by engagement of the pawl with a stop 79 on the frame 17.

Figure 8:
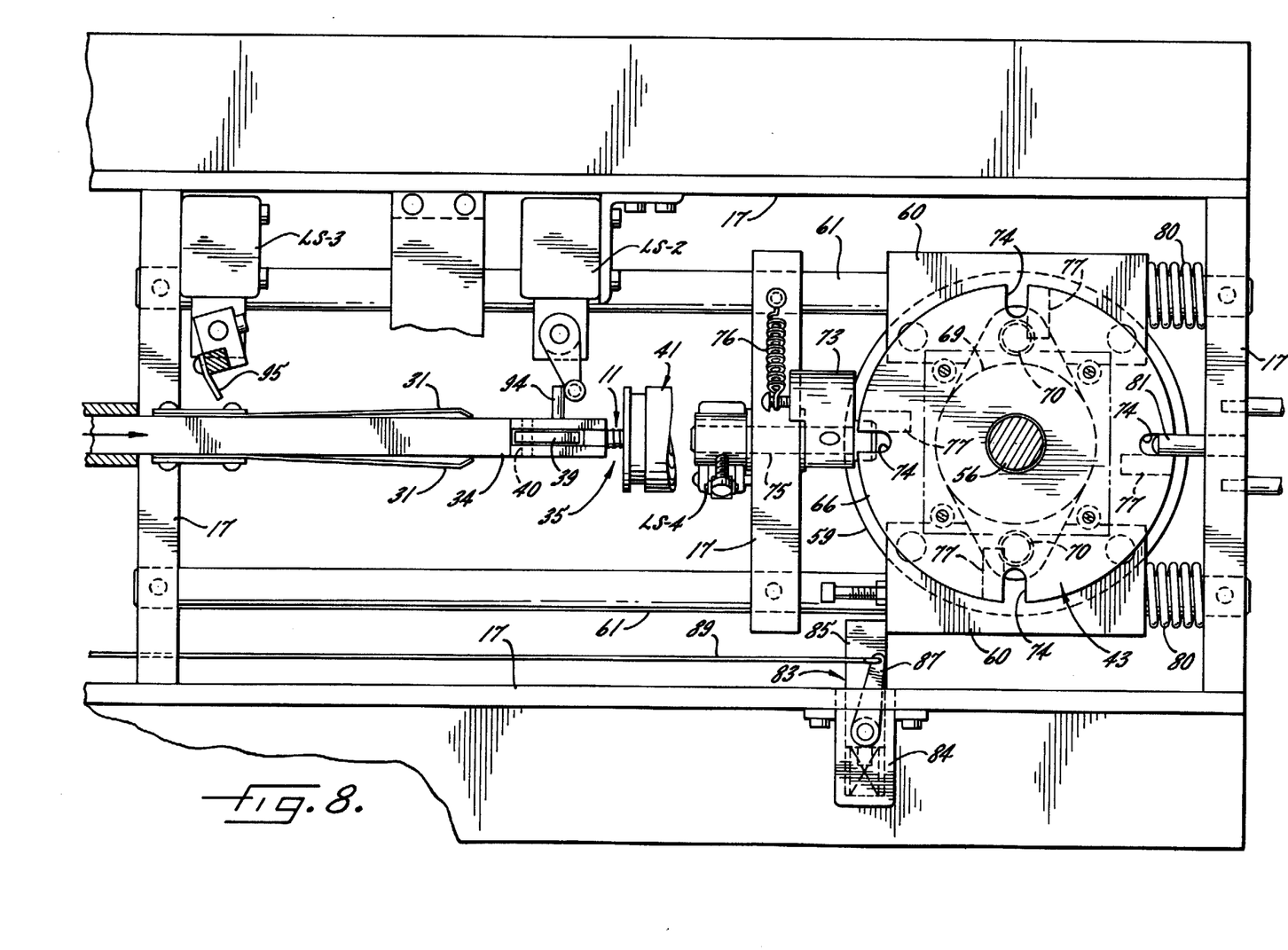
FIG. 8 is an enlarged fragmentary cross-section taken substantially along the line 8—8 of FIG. 5d.

Accordingly, the pawl 73 enters one of the notches 74 and stops the head 43 each time the latter rotates through ninety degrees to bring a different chuck 41 into the loading station 35. During the time the head is stopped, the pusher 34 loads a bolt 11 into the chuck in the manner described previously. After the chuck begins rotating the bolt, the pusher approaches the completion of its forward advance and, as an incident thereto, shoves the entire head 43 forwardly along the guide rods 61 (as shown in FIGS. 5d and 8) and against the bias of coil springs 80 which are telescoped over the rods and compressed between the frame 17 and the support blocks 60.

The forward movement of the head 43 along the rods 61 moves the notch 74 in the loading station 35 away from the locking pawl 73 (see FIGS. 5d and 8) to enable the latter to be swung counterclockwise by the spring 76. Although free from the pawl, the head does not immediately index, however, because forward movement of the head causes the diametrically opposite notch 74 in the driving station 55 to move into straddling relation with a pin 81 projecting horizontally from the frame 17 at the driving station. In addition, forward movement of the head activates a latch 83 (FIGS. 7 and 8) which momentarily holds the head in its forward position so as to prevent the springs 80 from returning the head rearwardly until the pawl 73 has swung downwardly and the pusher 34 has been retracted rearwardly. The latch is similar to a conventional household door latch and includes a housing 84 (FIG. 7) which is mounted on the frame 17 and which slidably receives a plunger 85. The latter is urged outwardly by a spring 86 in the housing and normally engages the outboard side of one of the support blocks 60. When the head is shoved forwardly, the plunger snaps outwardly into engagement with the rear face of the support block (see FIG. 8) to prevent the head from returning rearwardly under the urging of the springs 80. When a pivoted lever 87 on the housing 84 is turned counterclockwise, the plunger is retracted to free the head for rearward movement.

Retraction of the latching plunger 85 is effected automatically as an incident to retraction of the pusher 34. For this purpose, a rod-like link 89 (FIGS. 1 and 8) is connected at its rear end to a bracket 90 (FIG. 1) on the pusher and is connected at its other end to the lever 87 of the latch 83. As the pusher is retracted, the link turns the lever counterclockwise to retract the plunger 85 away from the block 60 and enable the springs 80 to shift the head 43 rearwardly to the position shown in FIGS. 3 and 5a. As an incident thereto, the notch 74 in the driving station 55 moves rearwardly away from the pin 81 thereby to free the head for rotation by the force created by the rotating chucks 41 and gears 63 and 64. The loaded chuck in the loading station 35 is thus rotated counterclockwise (FIG. 1) and is stopped after ninety degrees rotation when the following chuck moves into the loading station and the head 43 is again stopped by the pawl 73. After the following chuck has been loaded and during the next index of the head, the first loaded chuck is moved around to and stopped in the driving station 55 by virtue of the pawl once again stopping the head.

Figure 1:
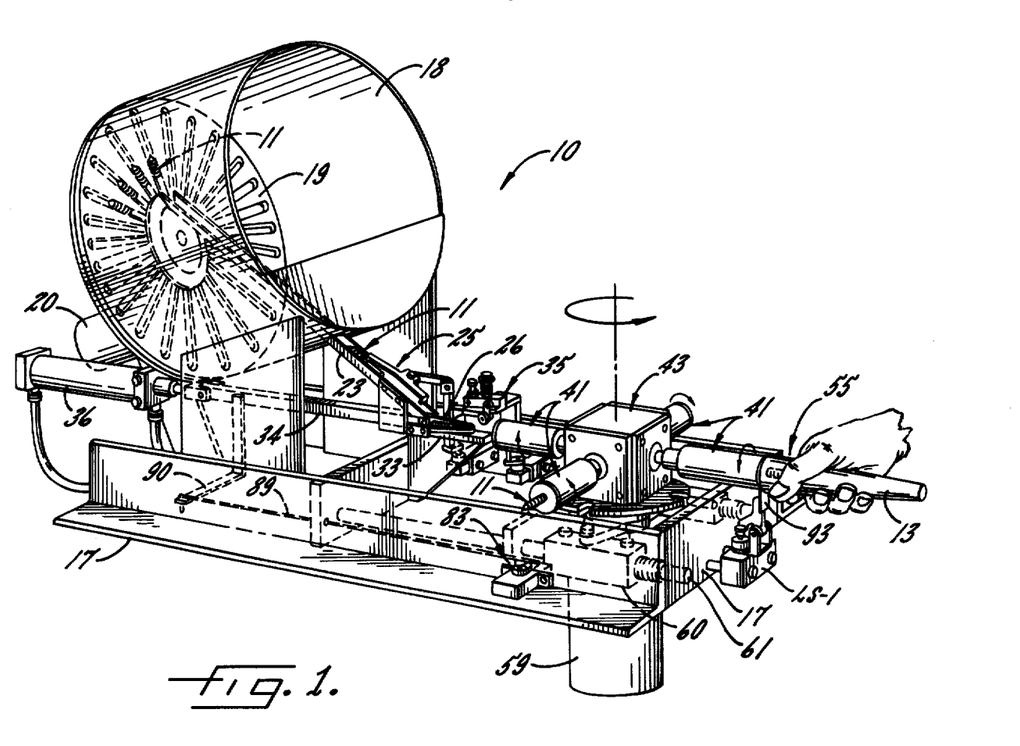
FIG. 1 is a perspective view of a new and improved fastener driving machine incorporating the novel features of the present invention.

Since the drive to the chucks 41 is not interrupted during stopping of the head 43, the chuck which is indexed to the driving station 55 continues to rotate its bolt 11 with such rotation being in a counterclockwise direction as viewed in FIG. 1. By taking the furniture leg 13 in one hand (see FIG. 1), the machine operator may telescope the hole 16 in the leg over the screw end 15 of the rotating bolt and, at the same time, push the leg rearwardly toward the chuck. As a result, the bolt is threaded rapidly into the hole and, as the driving approaches completion, the rear end of the leg engages a collar 91 (FIG. 5d) on the chuck and pushes the collar rearwardly. Rearward motion of the collar causes rotation of the jaws 45 to stop and thereafter the operator may pull the leg 13 to extract the fully driven bolt from the jaws. The empty chuck first indexes ninety degrees to an idle station and then indexes back to the loading station 35 as the following two chucks index into the driving station for driving of their bolts.

To summarize a complete cycle of operation of the machine 10, let it be assumed that the head 43 is in its rearward position (FIG. 3) and is stopped by the pawl 73, that the chuck 41 in the driving station 55 and the immediately preceding chuck have been loaded with bolts 11, and that the chuck in the loading station 35 is empty. Let is further be assumed that the pusher 34 is retracted, that a bolt is located in the pick up station 26 and is disposed on the rail 33 just ahead of the pusher, and that the escapement 25 is in its counterclockwise position shown in FIG. 3 with the finger 30 engaging the leading bolt on the track 23.

Now, as the operator completes driving of the bolt 11 in the driving station 55, the rear end of the rearwardly moving furniture leg 13 engages a lever 93 (FIGS. 1, 3 and 5b) to close a limit switch LS-1. Such closure causes shifting of a conventional solenoid-operated valve (not shown) which controls the air-operated actuator 36 to effect advancement of the pusher 34. The latter pushes the bolt in the pick-up station 26 forwardly and, as the pusher advances, a finger 94 (FIG. 8) on one side of the pusher engages a pivoted lug 95 and turns the latter counterclockwise. The lug acts through a pivoted linkage 96 (FIG. 5a) to rock the escapement 25 clockwise from the position shown in FIG. 3 and release the finger 30 from the leading bolt 11 on the track 23 and permit the bolt to slide downwardly against the tab 29.

As the pusher 34 loads its bolt 11 into the chuck 41 in the loading station 35 and approaches completion of its forward stroke, the head 43 is shoved forwardly (FIG. 5d) to release the pawl 73 from the notch 74 in the loading station. Indexing of the head is prevented, however, by virtue of the diametrically opposite notch 74 engaging the pin 81 in the driving station 55.

Forward movement of the head 43 causes the pawl 73 to swing to its inactive position and, at the same time, causes the latch plunger 85 (FIG. 8) to snap into locking relationship with the adjacent block 60 to prevent the head from being immediately returned rearwardly. The pusher 34 then completes its forward stroke and, as an incident thereto, the finger 94 engages the operator of a limit switch LS-2 (FIG. 8) to effect reversal of the control valve for the actuator 36 and cause retraction of the pusher. As the pusher moves rearwardly, the link 89 retracts the latch plunger 85 to enable the springs 80 to move the head 43 rearwardly to the position shown in FIG. 3 and to free the notch 74 in the driving station 55 from the pin 81. The head thus indexes to place a new loaded chuck 41 in the driving station 55 and is stopped by the pawl 73 pivoting upwardly into the notch 74 which moves into the loading station 35. As the pusher 34 completes its rearward stroke, the finger 94 (FIG. 8) cams the lug 95 clockwise to rock the escapement 25 counterclockwise (FIG. 5a) and permit the tab 30 to release the leading bolt on the track 23 to slide downwardly into the pick up station 26. The machine 10 now is ready for another cycle of operation. Preferably, a limit switch LS-3 (FIG. 8) is connected in series with the limit switch LS-1 and is closed by engagement of the finger 94 with the lug 95 when the pusher completes its rearward stroke so that the pusher cannot be re-advanced until fully retracted. An additional limit switch LS-4 (FIG. 7) also is serially connected with the switch LS-1 and is adapted to be closed when the pawl 73 is in its active position. The switch LS-4 prevents the operator from cycling the machine 10 if the head 43 is not initially locked against rotation.

From the foregoing, it will be apparent that the present invention brings to the art a new and improved machine 10 which enables substantially automated and high speed driving of the bolts 11 by virtue of loading the bolts automatically into the multi-chuck head 43 and then indexing the bolts into the driving station 55 where the bolts may be driven quickly and easily into the furniture legs 13. Indexing of the head is accomplished in a simple manner and without need of a positive index drive mechanism. In addition, the forward and rearward motion undertaken by the head can be used to advantage to automate the machine completely and eliminate the need for the operator to hold the legs at the driving station 55. That is, relatively simple auxiliary mechanism can be provided for automatically delivering the legs one-by-one to and holding the legs in a fixed position at the driving station. As the head moves forwardly, the bolt may be driven into the stationary leg and then the chuck may be retracted from the driven bolt as the head returns reversely and before the leg is advanced out of the driving station.

I claim as my invention:

1. A machine for driving threaded fasteners into workpieces, said machine comprising a support, means on said support for storing a supply of said fasteners and for delivering the fasteners one at a time to a pick up station, a feeder mounted on said support and operable to move each fastener in said pick up station in an endwise direction to a loading station, a head located on said support adjacent said loading station and having a series of angularly spaced and power-rotated chucks each adapted to grip a fastener and to rotate the same about its own axis, and means mounting said head for step-by-step rotational indexing about an axis extending substantially perpendicular to the axes of said chucks whereby each chuck is rotated into said loading station to receive and grip the fastener being moved into the loading station by said feeder and then is indexed to an angularly spaced driving station where the power-rotated fastener may be automatically threaded into a workpiece placed in engagement with the fastener.

2. A machine as defined in claim 1 in which said mounting means comprise a power driven shaft mounted on said support and having an axis coinciding with the rotational axis of said head, said shaft extending into said head and being rotatably journaled with respect to said head, means carried by said head and operably connecting said shaft and said chucks so as to rotate said chucks in response to rotation of said shaft, said head being turned about its rotational axis and relative to said shaft automatically as a result of rotation of said shaft and said chucks.

3. A machine as defined in claim 2 further including means for locking said head against rotation each time each chuck moves into said loading station and for then freeing said head to rotate after a fastener has been loaded into such chuck.

4. A machine as defined in claim 3 in which said locking means comprise a stop mounted on said support adjacent said loading station, a series of coacting stops spaced angularly around said head, and means mounting said head for back and forth movement toward and away from the stop on said support whereby the head may be moved away from said loading station between successive indexes thereby to shift successive stops on said head out of engagement with the stop on said support and free the head for rotational movement.

5. A machine as defined in claim 4 further including means biasing said head toward the stop on said support, the stops on said head being moved out of engagement with the stop on said support by the force created when said feeder loads said fasteners into said chucks.

6. A machine as defined in claim 5 in which the stops on said head comprise the trailing edges of a series of recesses spaced angularly around said head, the stop on said support comprising a member located adjacent the loading station and sized to fit into said recesses.

7. A machine as defined in claim 1 further including means mounting said head on said support for back and forth movement between said loading and driving stations, said head being moved forwardly toward said driving station after a fastener has been loaded into each chuck and moving reversely toward said loading station prior to the next index of the head.

8. A machine as defined in claim 1 further including means mounting said head on said support for back and forth movement between said loading and driving stations, said head being moved forwardly toward said driving station by the force created when said feeder loads said fasteners into said chucks, and means biasing said head for reverse movement toward said loading station.

9. A machine for driving threaded fasteners into workpieces, said machine comprising a support, means on said support for storing a supply of said fasteners and for delivering said fasteners one at a time to a pick up station, a pusher mounted on said support and operable to feed each fastener in said pick up station in an endwise direction to a loading station and then return to said pick up station, a head located on said support adjacent said loading station and having a series of angularly spaced chucks each adapted to grip a fastener, a power driven shaft mounted on said support and extending rotatably into said head at right angles to the axes of said chucks, means carried on said head and operably connecting said shaft and said chucks so as to rotate said chucks in response to rotation of said shaft, said head being turned about said shaft automatically as a result of rotation of said shaft and said chucks whereby each chuck turns into said loading station and then turns into a driving station spaced diametrically from said loading station means, mounting said head on said support for back and forth movement toward and away from said loading station and for biasing said head toward said loading station, coacting means on said support and said head and engageable with one another as an incident to movement of each chuck into said loading station thereby to stop the chuck in the loading station so the chuck may receive, grip and rotate a fastener being fed into the loading station by said pusher, said head being moved away from the loading station by the force created when the pusher loads the fastener in the chuck and then being returned toward the loading sation by said biasing means, said coacting means releasing said head for rotation after the latter has returned toward said loading station so the loaded chuck may be indexed to said driving station where the power-rotated fastener in the chuck may be threaded automatically into a workpiece placed in engagement with the fastener.

10. A machine as defined in claim 9 further including means for preventing said head from returning toward said loading station until said pusher has returned toward said pick up station.

* * * * *